United States Patent
Shavell et al.

(10) Patent No.: US 9,918,224 B1
(45) Date of Patent: Mar. 13, 2018

(54) SYSTEMS AND METHODS FOR PREVENTING COMPUTING DEVICES FROM SENDING WIRELESS PROBE PACKETS

(71) Applicant: Symantec Corporation, Mountain View, CA (US)

(72) Inventors: Michael Shavell, Merrimack, NH (US); Kevin Jiang, Lafayette, CA (US)

(73) Assignee: Symantec Corporation, Mountain View, CA (US)

( * ) Notice: Subject to any disclaimer, the term of this patent is extended or adjusted under 35 U.S.C. 154(b) by 58 days.

(21) Appl. No.: 14/949,927

(22) Filed: Nov. 24, 2015

(51) Int. Cl.
| H04M 1/66 | (2006.01) |
| H04W 12/02 | (2009.01) |
| H04W 4/02 | (2018.01) |
| H04W 64/00 | (2009.01) |
| H04W 52/02 | (2009.01) |

(52) U.S. Cl.
CPC .......... *H04W 12/02* (2013.01); *H04W 4/021* (2013.01); *H04W 52/0209* (2013.01); *H04W 64/00* (2013.01)

(58) Field of Classification Search
CPC . H04W 12/02; H04W 4/021; H04W 52/0209; H04W 64/00
USPC ....................................................... 455/411
See application file for complete search history.

(56) References Cited

U.S. PATENT DOCUMENTS

| 8,191,143 B1 | 5/2012 | Lin et al. |
| 8,606,219 B1 * | 12/2013 | Barbee ................. H04W 74/00 455/404.1 |
| 8,844,041 B1 | 9/2014 | Kienzle et al. |
| 9,420,513 B1 | 8/2016 | Yalagandula et al. |
| 9,730,075 B1 | 8/2017 | Shavell et al. |
| 2003/0219008 A1 | 11/2003 | Hrastar |
| 2003/0233567 A1 | 12/2003 | Lynn et al. |
| 2004/0117624 A1 | 6/2004 | Brandt et al. |
| 2004/0236547 A1 | 11/2004 | Rappaport et al. |
| 2006/0193284 A1 | 8/2006 | Stieglitz et al. |
| 2006/0200862 A1 | 9/2006 | Olson et al. |
| 2007/0079376 A1 | 4/2007 | Robert et al. |

(Continued)

OTHER PUBLICATIONS

Michael Shavell, et al; Systems and Methods for Detecting Network Security Deficiencies on Endpoint Devices; U.S. Appl. No. 15/199,149, filed Jun. 30, 2016.

(Continued)

*Primary Examiner* — William Nealon
(74) *Attorney, Agent, or Firm* — FisherBroyles, LLP

(57) ABSTRACT

The disclosed computer-implemented method for preventing computing devices from sending wireless probe packets may include (1) storing a geolocation of at least one wireless network that was previously accessed by the computing device, (2) determining a current geolocation of the computing device, (3) determining that the current geolocation of the computing device is not within a predetermined distance of the geolocation of any previously accessed wireless network, and (4) preventing the computing device from sending any wireless probe packets in response to determining that the current geolocation of the computing device is not within the predetermined distance of the geolocation of any previously accessed wireless access point. Various other methods, systems, and computer-readable media are also disclosed.

17 Claims, 7 Drawing Sheets

(56) References Cited

U.S. PATENT DOCUMENTS

| | | | |
|---|---|---|---|
| 2007/0153763 | A1 | 7/2007 | Rampolla et al. |
| 2007/0283042 | A1 | 12/2007 | West et al. |
| 2010/0172259 | A1 | 7/2010 | Aggarwal et al. |
| 2010/0207732 | A1 | 8/2010 | Patwari et al. |
| 2012/0304297 | A1 | 11/2012 | Chung et al. |
| 2012/0309420 | A1 | 12/2012 | Morgan et al. |
| 2013/0182697 | A1* | 7/2013 | Tuominen ............. G01S 5/0242 370/338 |
| 2013/0217358 | A1 | 8/2013 | Snider |
| 2013/0217411 | A1* | 8/2013 | Croy .................... H04W 4/021 455/456.1 |
| 2014/0201808 | A1 | 7/2014 | Yada |
| 2014/0304770 | A1 | 10/2014 | Jung |
| 2014/0378059 | A1* | 12/2014 | Ouchi ................... H04W 4/008 455/41.2 |
| 2015/0024787 | A1* | 1/2015 | Ben-Itzhak ............ H04L 12/18 455/456.4 |
| 2016/0029217 | A1 | 1/2016 | Yoo |
| 2016/0149935 | A1 | 5/2016 | Liu et al. |
| 2016/0192136 | A1 | 6/2016 | Pan et al. |
| 2016/0316426 | A1* | 10/2016 | Kumar ............. H04W 52/0206 |

OTHER PUBLICATIONS

Captive portal; https://en.wikipedia.org/wiki/Captive_portal, as accessed May 17, 2016; Wikipedia; (Jan. 25, 2005).
Justin Harmon; Systems and Methods for Detecting Potentially Illegitimate Wireless Access Points; U.S. Appl. No. 14/608,218, filed Jan. 29, 2015.
Michael Shavell, et al; Systems and Methods for Detecting Illegitimate Devices on Wireless Networks; U.S. Appl. No. 14/616,763, filed Feb. 9, 2015.
Michael Shavell, et al; Systems and Methods for Detecting Illegitimate Devices on Wireless Networks; U.S. Appl. No. 14/616,761, filed Feb. 9, 2015.
Justin Harmon; Systems and Methods for Detecting Potentially Illegitimate Wireless Access Points; U.S. Appl. No. 14/625,075, filed Feb. 18, 2015.
Lim, Kwontaek et al., "Scheme of Rogue AP detection in managed WLAN based on AP's location", http://xuebao.nuc.edu.cn/new/english.php?id=85&tid=646, as accessed Dec. 3, 2014, Journal of Measurement Science and Instrumentation, vol. 3 No. 4, Sum No. 12, (Dec. 2012).
Lim, Kwontaek et al., "Scheme of Rogue AP detection in managed WLAN based on AP's location", http://xuebao.nuc.edu.cn/new/uploads/File/jmsi2012-4-370.pdf, as accessed Dec. 3, 2014, Journal of Measurement Science and Instrumentation, vol. 3 No. 4, Sum No. 12, (Dec. 2012), pp. 370-373.
"WiFi Pineapple", https://www.wifipineapple.com/, as accessed Dec. 3, 2014, (Sep. 26, 2011).
"Smart WiFi Toggler", https://play.google.com/store/apps/details?id=com.sebouh00.smartwifitoggler&hl =en, as accessed Dec. 3, 2014, (Dec. 13, 2012).
"Coordinate Distance Calculator", http://boulter.com/gps/distance/?from=38.2500%B0+N%2C+85.7667%B0+W&to=38.0297%B0+N%2C+84.4947%B0+W&units=m, as accessed Dec. 3, 2014, (On or before Dec. 3, 2014).
"802.11 WLAN Packet Types", http://www.wildpackets.com/resources/compendium/wireless_lan/wlan_packet_types, as accessed Dec. 3, 2014, WildPackets, Inc., (Apr. 15, 2010).
"Wireless access point", http://en.wikipedia.org/wiki/Wireless_access_point, as accessed Dec. 3, 2014, Wikipedia, (Apr. 14, 2004).
"Stop connecting to a particular wifi network based on my location", http://android.stackexchange.com/questions/83925/stop-connecting-to-a-particular-wifi-network-based-on-my-location, as accessed Dec. 3, 2014, (Oct. 2, 2014).
"How to block apps on tablet from accessing the Internet while on tethering", http://android.stackexchange.com/questions/63987/how-to-block-apps-on-tablet-from-accessing-the-internet-while-on-tethering, as accessed Dec. 3, 2014, (Feb. 21, 2014).
Cipriani, Jason, "Stop Android 4.3 from always scanning for Wi-Fi networks", http://www.cnet.com/how-to/stop-android-4-3-from-always-scanning-for-wi-fi-networks/, as accessed Dec. 3, 2014, (Aug. 2, 2013).
Boubina Dr, "How to Disable Wifi Auto Connect on iPhone", https://snapguide.com/guides/disable-wifi-auto-connect-on-iphone/, as accessed Dec. 3, 2014, (Jul. 22, 2012).
"LG G3—WiFi Auto-On Issue", https://support.t-mobile.com/thread/75809, as accessed Dec. 3, 2014, (Aug. 7, 2014).
"Best Practices for Rogue Detection and Annihilation", http://airmagnet.flukenetworks.com/assets/whitepaper/Rogue_Detection_White_Paper.pdf, as accessed Dec. 3, 2014, a Technical Whitepaper, AirMagnet, Inc., (Nov. 2004).
"How do you prevent rogue wireless access points on a network?", http://networkengineering.stackexchange.com/questions/123/how-do-you-prevent-rogue-wireless-access-points-on-a-network, as accessed Dec. 3, 2014, (May 8, 2013).
K. N., Gopinath et al., "All You Wanted to Know About WiFi Rogue Access Points", http://www.rogueap.com/rogue-ap-docs/RogueAP-FAQ.pdf, as accessed Dec. 3, 2014, AirTight Networks, Inc., (2009).
"Rogue access point", http://en.wikipedia.org/wiki/Rogue_access_point, as accessed Dec. 3, 2014, Wikipedia, (Oct. 22, 2005).
"Rogue access points: Preventing, detecting and handling best practices", http://searchnetworking.techtarget.com/Rogue-access-points-Preventing-detecting-and-handling-best-practices, as accessed Dec. 3, 2014, TechTarget, (May 2009).
"Tracking down a rogue access point", http://security.stackexchange.com/questions/10783/tracking-down-a-rogue-access-point, as accessed Dec. 9, 2014, (Jan. 18, 2012).
"Traceroute", https://en.wikipedia.org/wiki/Traceroute, as accessed Dec. 9, 2014, Wikipedia, (Feb. 24, 2004).
Hunt, Troy, "The beginners guide to breaking website security with nothing more than a Pineapple", http://www.troyhunt.com/2013/04/the-beginners-guide-to-breaking-website.html, as accessed Dec. 9, 2014, (Apr. 17, 2013).
Michael Shavell, et al.; Systems and Methods for Detecting Illegitimate Devices on Wireless Networks; U.S. Appl. No. 14/617,245, filed Feb. 9, 2015.
"Why don't wifi managers remember mac addresses for hotspots to defeat the jasager attack?", http://security.stackexchange.com/questions/14854/why-dont-wifi-managers-remember-mac-addresses-for-hotspots-to-defeat-the-jasage, as accessed Dec. 9, 2014, (May 10, 2012).
"7. MAC Frame Formats", http://grouper.ieee.org/groups/802/15/pub/2001/Jul01/01292r1P802-15_TG3-Proposed-Changes-to-Frame-Formats.pdf, as accessed Dec. 9, 2014, (2001).
"Frame check sequence", http://en.wikipedia.org/wiki/Frame_check_sequence, as accessed Dec. 9, 2014, Wikipedia, (Apr. 5, 2005).
"Service set (802.11 network)", http://en.wikipedia.org/wiki/Service_set_%28802.11_network%029, as accessed Dec. 9, 2014, Wikipedia, (Jul. 10, 2009).
"Part 11: Wireless LAN Medium Access Control (MAC) and Physical Layer (PHY) Specifications", http://standards.ieee.org/getieee802/download/802.11-2012.pdf, as accessed Dec. 9, 2014, IEEE Std 802.11™-2012 (Revision of IEEE Std 802.11-2007), IEEE Computer Society, New York, (Feb. 6, 2012).
Dai Zovi, Dino A., "Karma Attacks Radioed Machines Automatically", http://theta44.org/karma/, as accessed Dec. 9, 2014, (Jan. 17, 2006).
Girsas, Paul, "Wifi Radar", https://play.google.com/store/apps/details?id=girsas.wifiradar&hl=en, as accessed Jan. 16, 2015, (Dec. 24, 2013).
"Chapter 6—Configuring Radio Setting", http://www.cisco.com/c/en/us/td/docs/wireless/access_point/12-4_10b_JA/configuration/guide/scg12410b/scg12410b-chap6-radio.html, as accessed Jan. 16, 2015, Cisco, (On or before Sep. 15, 2014).
"Chapter 9—Configuring an Access Point as a Local Authenticator", http://www.cisco.com/c/en/us/td/docs/wireless/access_point/12-4_10b_JA/configuration/guide/scg12410b/scg12410b-chap9-localauth.html, as accessed Jan. 16, 2015, Cisco, (On or before Sep. 6, 2014).

(56) References Cited

OTHER PUBLICATIONS

"WLA Series Wireless LAN Access Points", https://www.juniper.net/assets/us/en/local/pdf/datasheets/1000359-en.pdf, as accessed Jan. 16, 2015, Data Sheet, Juniper Networks, Inc., (Jun. 2013).

"Aruba 100 Series Access Points", http://www.arubanetworks.com/assets/ds/DS_AP100Series.pdf, as accessed Jan. 16, 2015, Data Sheet, Aruba Networks, Inc., (On or before Jan. 16, 2015).

Notenboom, Leo A., "How can I block neighboring wireless networks?", http://ask-leo.com/how_can_i_block_neighboring_wireless_networks.html, as accessed Jan. 16, 2015, (Jan. 30, 2007).

Roos, Dave, "How Wireless Mesh Networks Work", http://computer.howstuffworks.com/how-wireless-mesh-networks-work.htm, as accessed Jan. 16, 2015, (Dec. 4, 2008).

Leslie, David, "Rogue Wireless Access Point Detection and Remediation", http://www.giac.org/paper/gsec/4060/rogue-wireless-access-point-detection-remediation/106460, as accessed Jan. 16, 2015, Global Information Assurance Certification Paper, SANS Institute 2004, (Sep. 9, 2004).

Pacchiano, Ronald, "How to Track Down Rogue Wireless Access Points", http://www.smallbusinesscomputing.com/webmaster/article.php/3590656/How-to-Track-Down-Rogue-Wireless-Access-Points.htm, as accessed Jan. 16, 2015, (Mar. 10, 2006).

"Rogue Detection under Unified Wireless Networks", http://www.cisco.com/c/en/us/support/docs/wireless-mobility/wireless-lan-wlan/70987-rogue-detect.html, as accessed Jan. 16, 2015, Document ID: 70987, Cisco, (On or before Sep. 25, 2007).

"Locating Rogue WiFi Access Points", https://www.virtuesecurity.com/blog/locating-rogue-wifi-access-points/, as accessed Jan. 16, 2015, Virtue Security, (Oct. 5, 2013).

"NetSurveyor—802.11 Network Discovery / WiFi Scanner", http://nutsaboutnets.com/netsurveyor-wifi-scanner/, as accessed Jan. 16, 2015, Nuts About Nets, (Nov. 16, 2011).

Ankit Kurani; Systems and Methods for Detecting Potentially Illegitimate Wireless Access Points; U.S. Appl No. 14/732,811, filed Jun. 8, 2015.

"Domain Name System", http://en.wikipedia.org/wiki/Domain_Name_System, as accessed Apr. 6, 2015, Wikipedia, (Jan. 23, 2004).

Mitchell, Bradley, "What Is a DNS Server?", http://compnetworking.about.com/od/dns_domainnamesystem/f/dns_servers.htm , as accessed Apr. 6, 2015, (Feb. 19, 2007).

"What is the difference between public and private IP addresses?", http://supportcenter.verio.com/KB/questions.php?questionid=655, as accessed Apr. 6, 2015, Verio Inc., (On or before Apr. 6, 2015).

"802.11 WLAN Packet Types", http://www.wildpackets.com/resources/compendium/wireless_lan/wlan_packet_types, as accessed Oct. 14, 2015, (Apr. 15, 2010).

* cited by examiner

SYSTEMS AND METHODS FOR PREVENTING COMPUTING DEVICES FROM SENDING WIRELESS PROBE PACKETS

BACKGROUND

As wireless networks become increasingly prevalent, many users expect their mobile devices to seamlessly connect to available wireless networks. Users want to be able to boot up their laptop or swipe into their smartphone and find that their device is already connected to the nearest source of Internet. To accommodate this desire, many mobile devices send out constant probes to determine if any wireless networks that the device has previously accessed are within range. These probes include the name of the wireless network being sought. Unfortunately, this behavior poses a security problem. For example, by constantly sending out probes with the names of different previously accessed networks, a device is also constantly broadcasting information about itself and its owner. An attacker monitoring wireless probes can learn what coffee shops, offices, hotels, airports, and other locations a user frequents. The attacker can then use this information for a variety of malicious purposes, including social engineering.

Traditional systems for guarding against the problems raised by indiscriminate wireless probes may disable the wireless probe functionality entirely. However, this may result in a diminished user experience as the device may no longer connect automatically and seamlessly to previously accessed wireless networks. Accordingly, the instant disclosure identifies and addresses a need for additional and improved systems and methods for securing computing devices that attempt to send wireless probe packets.

SUMMARY

As will be described in greater detail below, the instant disclosure describes various systems and methods for preventing devices from sending wireless probe packets to any network that isn't within a reasonable distance of the device's current location. By preventing devices from sending extraneous packets that reveal information about the user's habits, the systems and methods described herein may reduce resource consumption and increase user and device security.

In one example, a computer-implemented method for preventing computing devices from sending wireless probe packets may include (1) storing the geolocation of at least one wireless network that was previously accessed by the computing device, (2) determining the current geolocation of the computing device, (3) determining that the current geolocation of the computing device is not within a predetermined distance of the geolocation of any previously accessed wireless network, and (4) preventing the computing device from sending any wireless probe packets in response to determining that the current geolocation of the computing device is not within the predetermined distance of the geolocation of any previously accessed wireless access point.

In one example, the computer-implemented method may further include determining the new current geolocation of the computing device and determining that the new current geolocation of the computing device is within the predetermined distance of the geolocation of the previously accessed wireless network. In this example, the computer-implemented method may also include allowing the computing device to send a wireless probe packet addressed to the previously accessed wireless network while preventing the computing device from sending any wireless probe packets not addressed to the previously accessed wireless network.

In one embodiment, the computer-implemented method may further include detecting that the computing device has connected to a new wireless network and storing the geolocation of the new wireless network. In some examples, storing the geolocation of the wireless network may include storing the geolocation of the computing device at the time the computing device most recently accessed the wireless network. In some examples, storing the geolocation of the wireless network may include storing an additional geolocation of the wireless network in response to the computing device connecting to a new wireless network with the same name as the wireless network from a different geolocation than the stored geolocation of the wireless network.

In some embodiments, preventing the computing device from sending any wireless probe packets may include blocking the computing device from sending wireless probe packets that have been created by the computing device. Additionally or alternatively, preventing the computing device from sending any wireless probe packets may include preventing the computing device from creating any wireless probe packets.

In one embodiment, a system for implementing the above-described method may include a variety of modules stored in memory, including (1) a storing module that stores a geolocation of at least one wireless network that was previously accessed by the computing device, (2) a determination module that determines a current geolocation of the computing device, (3) a distance module that determines that the current geolocation of the computing device is not within a predetermined distance of the geolocation of any previously accessed wireless network, (4) a prevention module that prevents the computing device from sending any wireless probe packets in response to determining that the current geolocation of the computing device is not within the predetermined distance of the geolocation of any previously accessed wireless access point, and (5) at least one physical processor configured to execute the storing module, the determination module, the distance module, and the prevention module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) store a geolocation of at least one wireless network that was previously accessed by the computing device, (2) determine a current geolocation of the computing device, (3) determine that the current geolocation of the computing device is not within a predetermined distance of the geolocation of any previously accessed wireless network, and (4) prevent the computing device from sending any wireless probe packets in response to determining that the current geolocation of the computing device is not within the predetermined distance of the geolocation of any previously accessed wireless access point.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
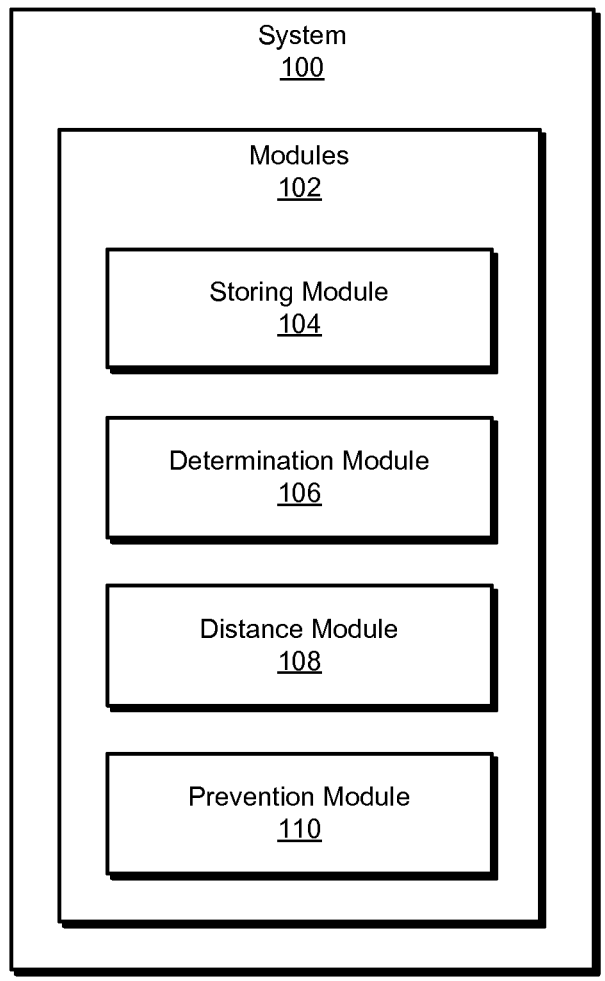
FIG. 1 is a block diagram of an exemplary system for preventing computing devices from sending wireless probe packets.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for preventing computing devices from sending wireless probe packets. As will be explained in greater detail below, by preventing devices from sending wireless probe packets indiscriminately, the systems and methods described herein may prevent devices from leaking information about a user's travels and habits and reduce the risk of certain types of attacks against the user.

Figure 2:
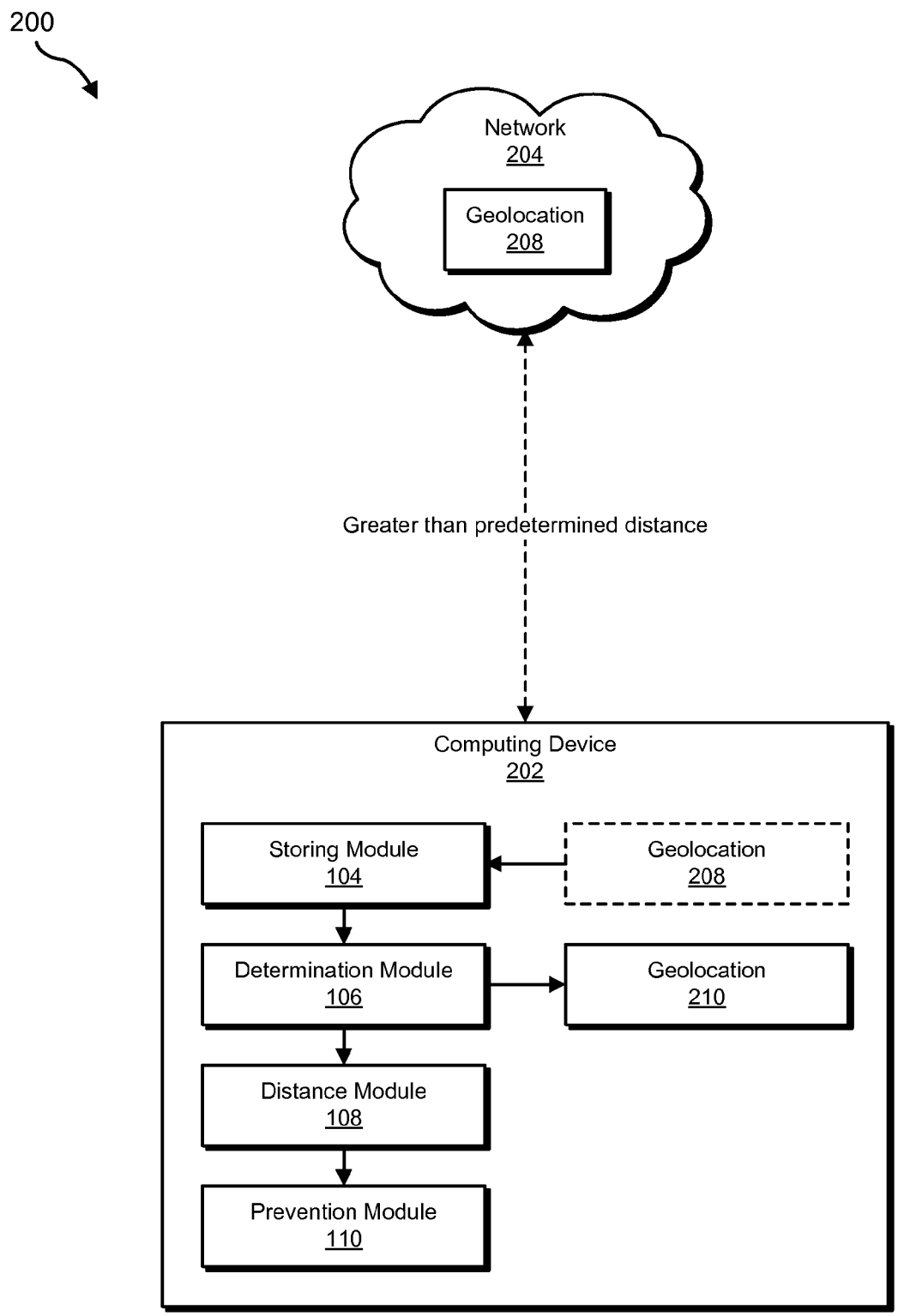
FIG. 2 is a block diagram of an additional exemplary system for preventing computing devices from sending wireless probe packets.
Figure 3:
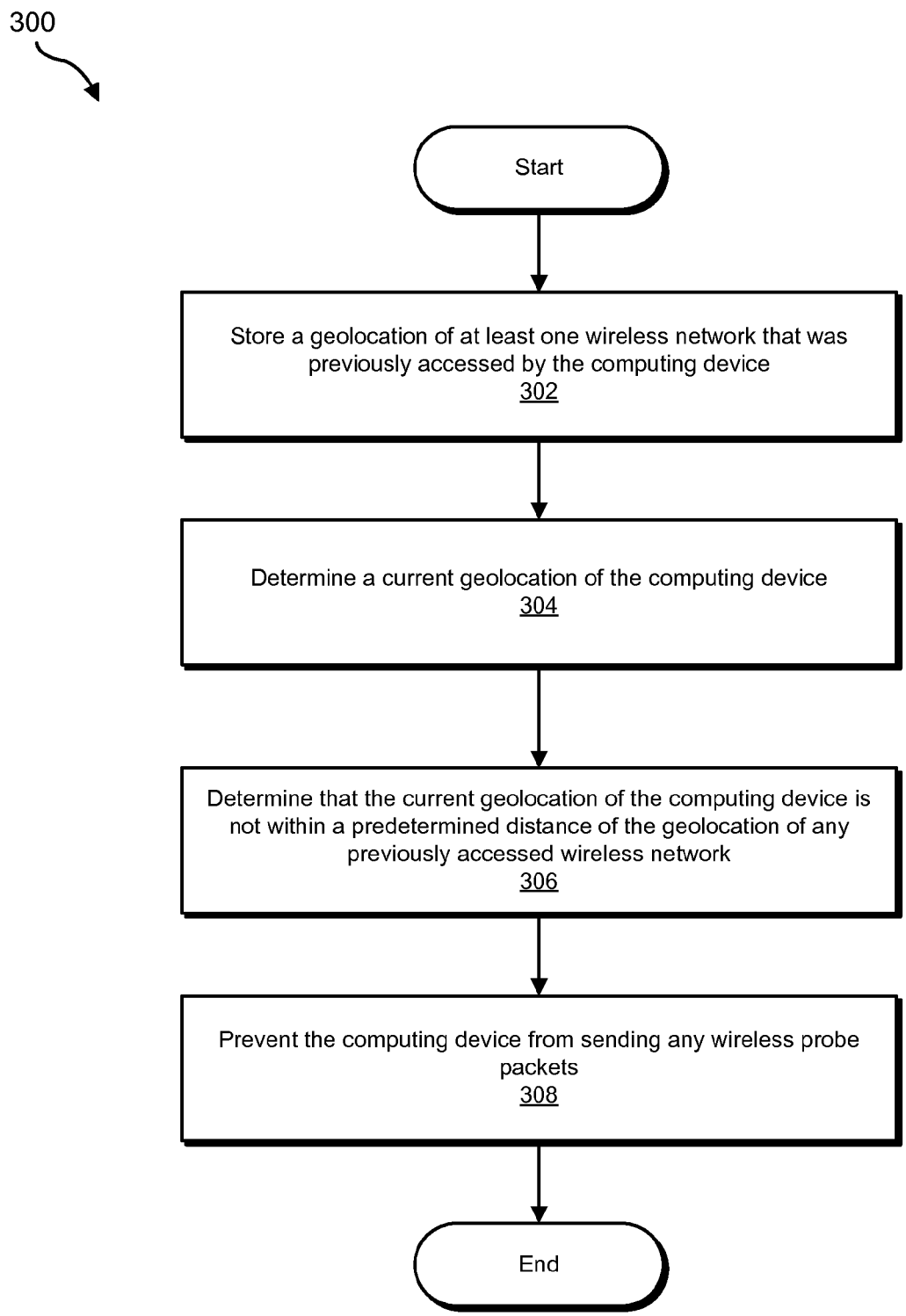
FIG. 3 is a flow diagram of an exemplary method for preventing computing devices from sending wireless probe packets.
Figure 4:
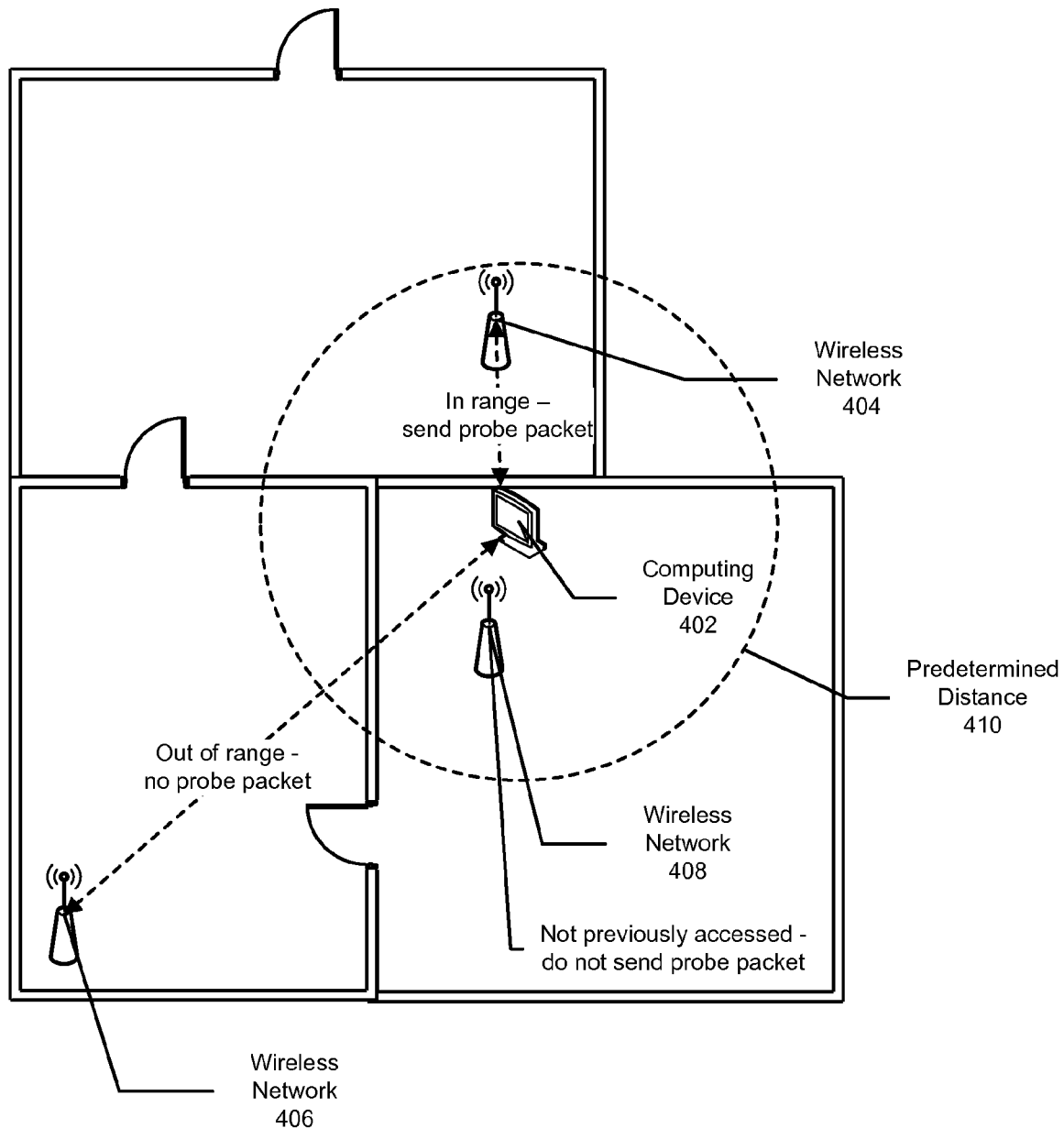
FIG. 4 is a block diagram of an exemplary computing system for preventing computing devices from sending wireless probe packets.

The following will provide, with reference to FIGS. 1, 2, and 4, detailed descriptions of exemplary systems for preventing computing devices from sending wireless probe packets. Detailed descriptions of corresponding computer-implemented methods will also be provided in connection with FIG. 3. Detailed descriptions of exemplary sets of wireless probe packets will be provided in connection with FIG. 5. In addition, detailed descriptions of an exemplary computing system and network architecture capable of implementing one or more of the embodiments described herein will be provided in connection with FIGS. 6 and 7, respectively.

FIG. 1 is a block diagram of exemplary system 100 for preventing computing devices from sending wireless probe packets. As illustrated in this figure, exemplary system 100 may include one or more modules 102 for performing one or more tasks. For example, and as will be explained in greater detail below, exemplary system 100 may include a storing module 104 that stores a geolocation of at least one wireless network that was previously accessed by the computing device. Exemplary system 100 may additionally include a determination module 106 that determines a current geolocation of the computing device. Exemplary system 100 may also include a distance module 108 that determines that the current geolocation of the computing device is not within a predetermined distance of the geolocation of any previously accessed wireless network. Exemplary system 100 may additionally include a prevention module 110 that prevents the computing device from sending any wireless probe packets in response to determining that the current geolocation of the computing device is not within the predetermined distance of the geolocation of any previously accessed wireless access point. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as computing device 202 in FIG. 2, computing system 610 in FIG. 6, and/or portions of exemplary network architecture 700 in FIG. 7. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 that is farther than a predetermined distance from a network 204. In one example, computing device 202 may be programmed with one or more of modules 102.

In one embodiment, one or more of modules 102 from FIG. 1 may, when executed by at least one processor of computing device 202, enable computing device 202 to prevent computing devices from sending wireless probe packets. For example, and as will be described in greater detail below, storing module 104 may store a geolocation 208 of at least one wireless network 204 that was previously accessed by computing device 202. At regular intervals, determination module 106 may determine a current geolocation 210 of computing device 202. Next, distance module 108 may determine that current geolocation 210 of computing device 202 is not within a predetermined distance of geolocation 208 of any previously accessed wireless network 204. After these determinations are made, prevention module 110 may prevent computing device 202 from sending any wireless probe packets in response to determining that current geolocation 210 of computing device 202 is not within the predetermined distance of geolocation 208 of any previously accessed wireless access point.

Computing device 202 generally represents any type or form of computing device capable of reading computer-executable instructions. In some embodiments, computing device 202 may be a mobile device. Examples of computing device 202 include, without limitation, laptops, tablets, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless connections. In one embodiment, network 204 may have been previously accessed by computing device 202.

FIG. 3 is a flow diagram of an exemplary computer-implemented method 300 for preventing computing devices from sending wireless probe packets. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302, one or more of the systems described herein may store the geolocation of at least one wireless network that was previously accessed by a computing device. For example, storing module 104 may, as part of computing device 202 in FIG. 2, store geolocation 208 of at least one wireless network 204 that was previously accessed by computing device 202.

The term "geolocation," as used herein, generally refers to any description of the location of a wireless network. Examples of geolocation may include, without limitation, global positioning system (GPS) coordinates, coordinates in any other mapping system, and/or street addresses.

Storing module 104 may store the geolocations of the wireless networks in a variety of ways and contexts. For example, storing module 104 may store the geolocations in a database, a flat file, a list, an array, a hash map, and/or any other suitable data structure and/or storage system. In some embodiments, storing module 104 may store the geolocation of the wireless network by storing the geolocation of the computing device at the time the computing device most recently accessed the wireless network. Additionally or alternatively, storing module 104 may store the geolocation of at least one wireless access point that provides access to the wireless network.

In one embodiment, storing module 104 may store only the initially stored geolocation for a wireless network and may not update the stored location unless the new location is significantly different from the stored location. In another embodiment, storing module 104 may update the stored location every time the computing device connects to the wireless network.

In one example, storage module 104 may detect that the computing device has connected to a new wireless network and may store the geolocation of the new wireless network. In some embodiments, storing module 104 may only store a geolocation for a new wireless network under certain circumstances, such as if the user has designated the new wireless network as a preferred network and/or configured the computing device to automatically connect to the new wireless network.

In some examples, storing module 104 may store an additional geolocation of the wireless network in response to the computing device connecting to a new wireless network with the same name as the wireless network from a different geolocation than the stored geolocation of the wireless network. For example, a user may connect to a "Sym-Office" wireless network at their local office and storing module 104 may store a geolocation for "Sym-Office." The user may then travel to an office in another city and connect to the "Sym-Office" network at that location. Storing module 104 may store both geolocations for the "Sym-Office" network so that the computing device will send wireless probe packets to the network and thus automatically connect to the network at both offices. In another example, a user may connect to wireless networks with the same name in multiple branches of the same bookstore, coffee shop, or other retailer, and storing module 104 may store multiple locations for all of those networks.

In some embodiments, storing module 104 may only store a new geolocation for a wireless network with a previously stored geolocation if the new geolocation is above a minimum threshold for distance from a previously stored location. For example, if a user connects to a wireless network from rooms on opposite ends of an office building, storing module 104 may not store a new geolocation after the first connection. In other embodiments, storing module 104 may store multiple nearby geolocations for wireless networks in order to build a more accurate map of the coverage of the wireless network and thus more accurately predict when to send wireless probe packets.

At step 304, one or more of the systems described herein may determine a current geolocation of the computing device. For example, determination module 106 may, as part of computing device 202 in FIG. 2, determine current geolocation 210 of computing device 202.

Determination module 106 may determine the current geolocation of the computing device in a variety of ways. For example, determination module 106 may use a GPS receiver in the computing device to determine the geolocation of the computing device. In another embodiment, determination module 106 may use triangulation from nearby cell towers to determine the geolocation of the computing device.

At step 306, one or more of the systems described herein may determine that the current geolocation of the computing device is not within a predetermined distance of the geolocation of any previously accessed wireless network. For example, distance module 108 may, as part of computing device 202 in FIG. 2, determine that current geolocation 210 of computing device 202 is not within a predetermined distance of geolocation 208 of any previously accessed wireless network 204.

The term "predetermined distance," as used herein, generally refers to any measurement of distance. In some embodiments, the predetermined distance may be calculated to be the approximate maximum range of a wireless network. In other embodiments, the predetermined distance may be larger in order to account for inaccuracies in the stored geolocation of the wireless network. In one embodiment, the predetermined distance may be 100 yards.

Distance module 108 may determine the computing device is not within a predetermined distance of any of the previously accessed wireless networks in a variety of ways. For example, distance module 108 may calculate the current distance between the computing device and the stored geolocation of each previously accessed wireless network.

In another example, distance module 108 may have access to stored information about the radius around each wireless network geolocation that represents the predetermined distance and distance module 108 may determine whether the computing device is currently within any of the stored radii.

At step 308, one or more of the systems described herein may prevent the computing device from sending any wireless probe packets in response to determining that the current geolocation of the computing device is not within the predetermined distance of the geolocation of any previously accessed wireless access point. For example, prevention module 110 may, as part of computing device 202 in FIG. 2, prevent computing device 202 from sending any wireless probe packets in response to determining that current geolocation 210 of computing device 202 is not within the predetermined distance of geolocation 208 of any previously accessed wireless access point.

The term "wireless probe packet," as used herein, generally refers to any data sent from a computing device to or in search of a wireless network. In some embodiments, a wireless probe packet may include a probe request packet of type 00 and subtype 0100 according to the 802.1 WLAN standard.

Prevention module 110 may prevent the computing device from sending any wireless probe packets in a variety of ways. For example, prevention module 110 may prevent the computing device from sending any wireless probe packets by blocking the computing device from sending wireless probe packets that have been created by the computing device. In one embodiment, prevention module 110 may hook in at the driver level and prevent wireless probe packets from being sent. In other embodiments, prevention module 110 may prevent the computing device from sending any wireless probe packets by preventing the computing device from creating any wireless probe packets. For example, prevention module 110 may hook into the wireless driver and prevent wireless probe packets from being created. In this embodiment, wireless probe packets sent to previously accessed networks within range may be created programmatically.

In some examples, prevention module 110 may allow the computing device to send wireless probe packets to a previously accessed wireless network that distance module 108 has determined to be in range. As illustrated in FIG. 4, prevention module 110 may allow computing device 402 to send wireless probe packets to wireless network 404 because wireless network 404 has been previously accessed and is within predetermined distance 410. However, prevention module 110 may prevent computing device 402 from sending wireless probe packets to wireless network 406, which has been previously accessed but is out of range, and/or wireless network 408, which is within range but has not been previously accessed.

Figure 5:
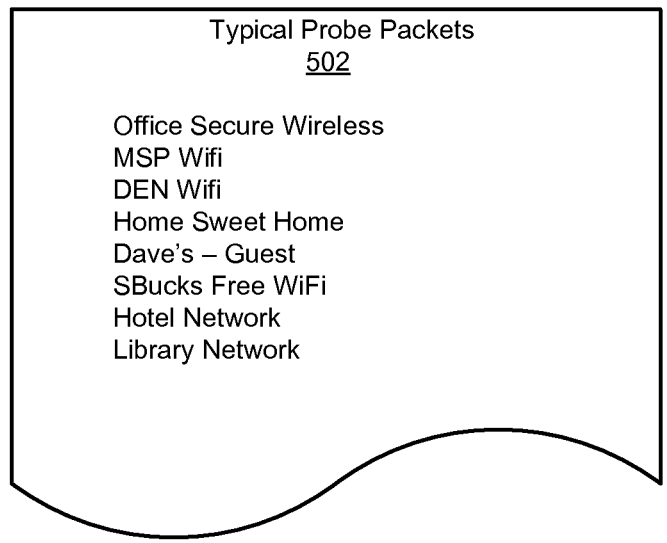
FIG. 5 is a block diagram of exemplary sets of wireless probe packets.
Figure 5:
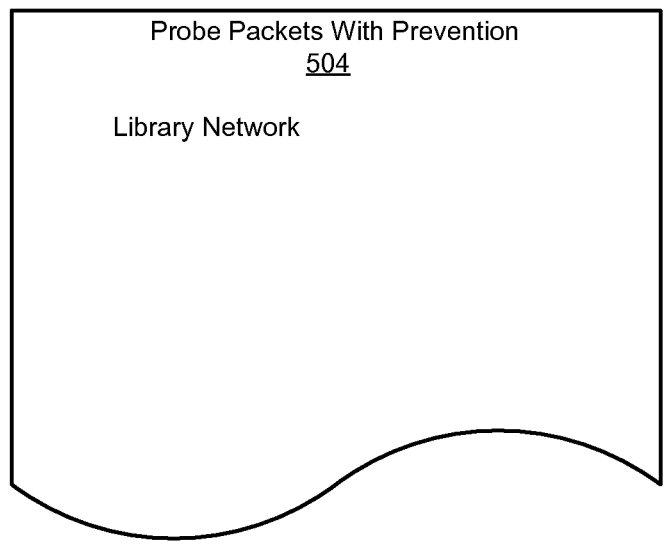

By avoiding sending probe packets indiscriminately, the systems described herein may prevent the computing device from sending out information that allows the device to be fingerprinted and also opens the user to spear phishing attacks. As illustrated in FIG. 5, many computing devices constantly send out a set of probe packets similar to typical probe packets 502. An attacker listening for probe packets may deduce, from typical probe packets 502, the user's employer, home network name, travel patterns, favorite coffee shop, favorite bookstore, and other information. Because the list of networks in typical probe packets 502 may be distinct from the probe packets sent out by other computing devices, an attacker may recognize the computing device and be able to track the computing device across locations. The attacker may also use information about the user's employer, etc., in spear phishing attacks, identity theft attempts, and/or other attacks against the user.

However, probe packets with prevention 504 illustrates an exemplary set of probe packets sent by a device on which the systems described herein are operating. The only probe packet sent out may be for the library network, if the library network is currently in range. This single probe packet may not be enough to fingerprint the device and gives an attacker very little information to use for a spear phishing attack. If the computing device is not near any previously accessed wireless networks, then the device may not send out any probe packets, effectively camouflaging the device from any attacker who is capturing wireless probe packets.

As described in connection with method 300 above, the systems and methods described herein may prevent a computing device from constantly sending out wireless probe packets for all previously accessed networks. Instead, the device may only send out wireless probe packets to previously accessed wireless networks that are nearby and likely to be in connection range. By avoiding sending out extraneous wireless probe packets, the systems and methods described herein may both reduce resource consumption on the device and increase device and user security against attackers scanning for wireless probe packets.

Figure 6:
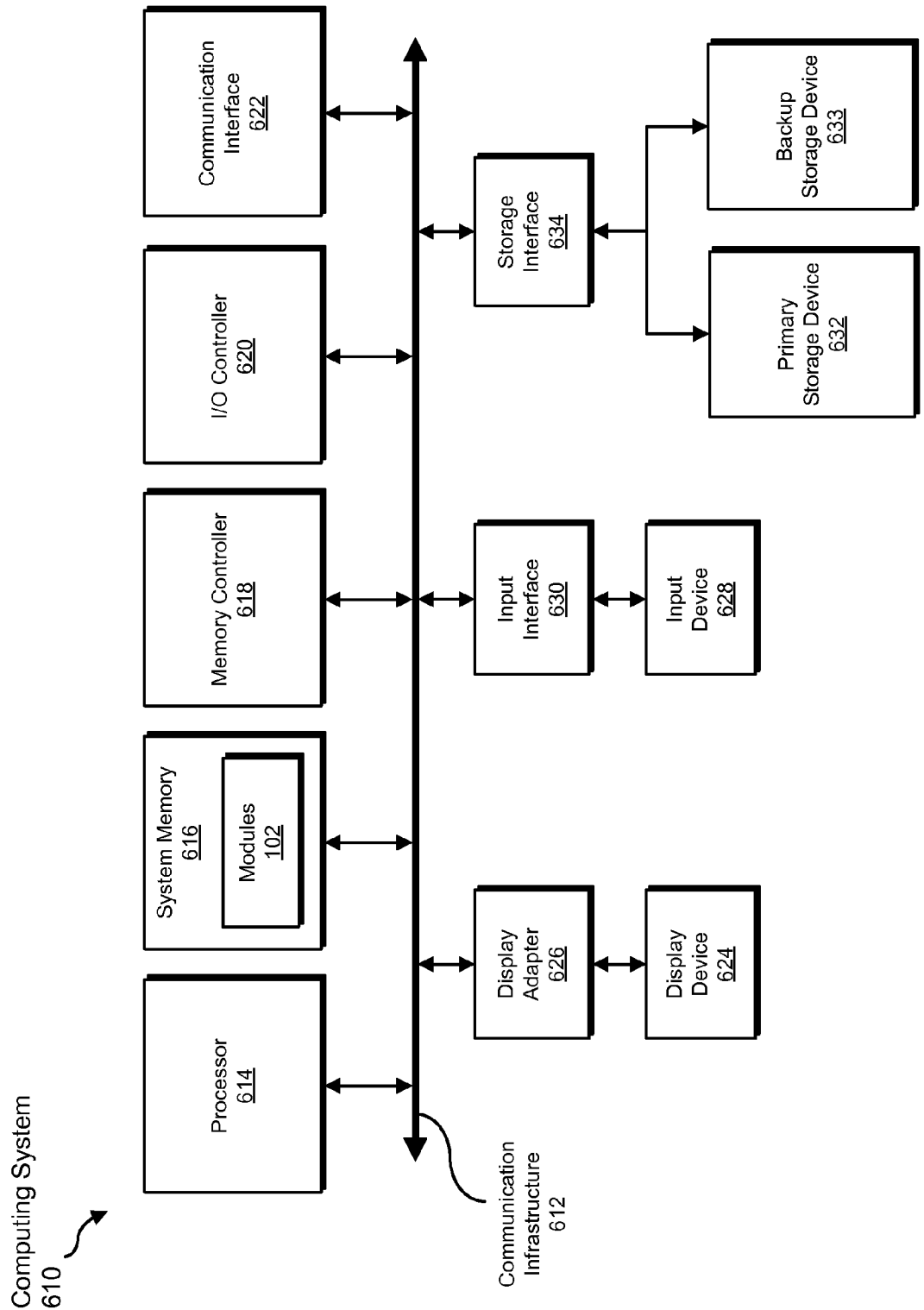
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
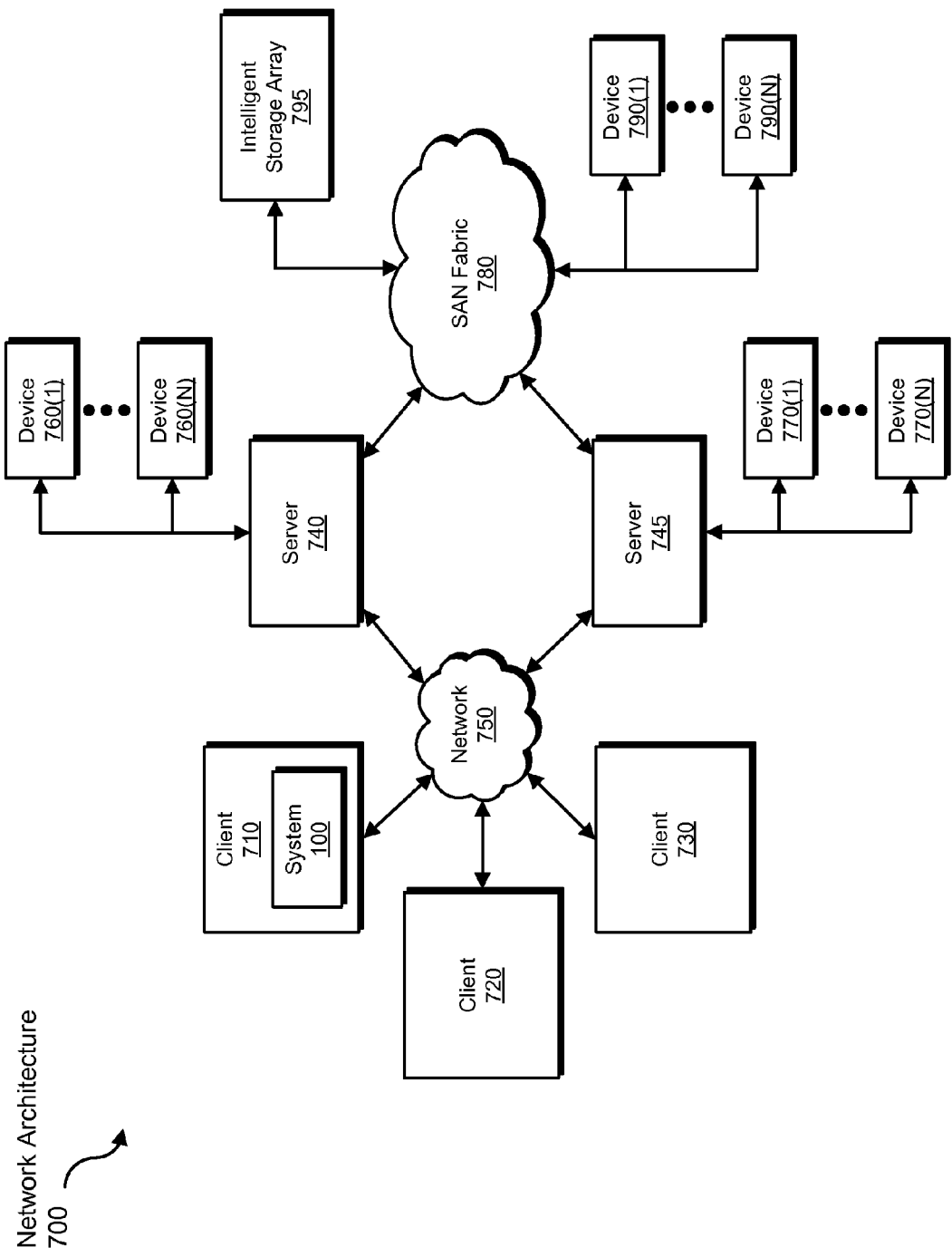
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for preventing computing devices from sending wireless probe packets.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive location data to be transformed, transform the location data into distance data, output a result of the transformation to a module, use the result of the transformation to determine if a wireless network is within a predetermined distance of a device, and store the result of the transformation to temporary storage. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for preventing computing devices from sending wireless probe packets, at least a portion of the method being performed by a computing device comprising at least one processor, the method comprising:
   storing a geolocation of at least one wireless network that was previously accessed by the computing device;
   determining a current geolocation of the computing device;
   determining that the current geolocation of the computing device is not within a predetermined distance of the geolocation of any previously accessed wireless network;
   preventing the computing device from sending any wireless probe packets in response to determining that the current geolocation of the computing device is not within the predetermined distance of the geolocation of any previously accessed wireless access point;
   connecting to the least one wireless network from a different geolocation than the stored geolocation of the at least one wireless network;
   storing the different geolocation as an additional geolocation of the at least one wireless network;
   storing a plurality of nearby geolocations for the at least one wireless network; and
   building a coverage map of the at least one wireless network based on the stored plurality of nearby geolocations.

2. The computer-implemented method of claim 1, further comprising:
   determining a new current geolocation of the computing device;
   determining that the new current geolocation of the computing device is within the predetermined distance of the geolocation of the previously accessed wireless network;
   allowing the computing device to send a wireless probe packet addressed to the previously accessed wireless network while preventing the computing device from sending any wireless probe packets not addressed to the previously accessed wireless network.

3. The computer-implemented method of claim 1, further comprising:
   detecting that the computing device has connected to a new wireless network;
   storing a geolocation of the new wireless network.

4. The computer-implemented method of claim 1, wherein storing the geolocation of the wireless network comprises storing a geolocation of the computing device at the time the computing device most recently accessed the wireless network.

5. The computer-implemented method of claim 1, wherein preventing the computing device from sending any wireless probe packets comprises blocking the computing device from sending wireless probe packets that have been created by the computing device.

6. The computer-implemented method of claim 1, wherein preventing the computing device from sending any wireless probe packets comprises preventing the computing device from creating any wireless probe packets.

7. A system for preventing computing devices from sending wireless probe packets, the system comprising:
   a storing module, stored in memory, that:
      stores a geolocation of at least one wireless network that was previously accessed by a computing device;
      detects that the computing device has connected to the at least one wireless network;
      stores the different geolocation as an additional geolocation of the at least one wireless network;
      stores a plurality of nearby geolocations for the at least one wireless network; and
      builds a coverage map of the at least one wireless network based on the stored plurality of nearby geolocations;
   a determination module, stored in memory, that determines a current geolocation of the computing device;
   a distance module, stored in memory, that determines that the current geolocation of the computing device is not within a predetermined distance of the geolocation of any previously accessed wireless network;
   a prevention module, stored in memory, that prevents the computing device from sending any wireless probe packets in response to determining that the current geolocation of the computing device is not within the predetermined distance of the geolocation of any previously accessed wireless access point; and
   at least one physical processor configured to execute the storing module, the determination module, the distance module, and the prevention module.

8. The system of claim 7, wherein:
   the determination module determines a new current geolocation of the computing device;
   the distance module determines that the new current geolocation of the computing device is within the predetermined distance of the geolocation of the previously accessed wireless network;
   the prevention module allows the computing device to send a wireless probe packet addressed to the previously accessed wireless network while preventing the computing device from sending any wireless probe packets not addressed to the previously accessed wireless network.

9. The system of claim 7, wherein the storing module:
   detects that the computing device has connected to a new wireless network;
   stores a geolocation of the new wireless network.

10. The system of claim 7, wherein the storing module stores the geolocation of the wireless network by storing a geolocation of the computing device at the time the computing device most recently accessed the wireless network.

11. The system of claim 7, wherein the prevention module prevents the computing device from sending any wireless probe packets by blocking the computing device from sending wireless probe packets that have been created by the computing device.

12. The system of claim 7, wherein the prevention module prevents the computing device from sending any wireless probe packets by preventing the computing device from creating any wireless probe packets.

13. A non-transitory computer-readable medium comprising one or more computer-readable instructions that, when executed by at least one processor of a computing device, cause the computing device to:

store a geolocation of at least one wireless network that was previously accessed by the computing device;

determine a current geolocation of the computing device;

determine that the current geolocation of the computing device is not within a predetermined distance of the geolocation of any previously accessed wireless network;

prevent the computing device from sending any wireless probe packets in response to determining that the current geolocation of the computing device is not within the predetermined distance of the geolocation of any previously accessed wireless access point;

connect to the least one wireless network from a different geolocation than the stored geolocation of the at least one wireless network;

store the different geolocation as an additional geolocation of the at least one wireless network;

store a plurality of nearby geolocations for the at least one wireless network; and build a coverage map of the at least one wireless network based on the stored plurality of nearby geolocations.

14. The non-transitory computer-readable medium of claim 13, wherein the one or more computer-readable instructions cause the computing device to:

determine a new current geolocation of the computing device;

determine that the new current geolocation of the computing device is within the predetermined distance of the geolocation of the previously accessed wireless network;

allow the computing device to send a wireless probe packet addressed to the previously accessed wireless network while preventing the computing device from sending any wireless probe packets not addressed to the previously accessed wireless network.

15. The non-transitory computer-readable medium of claim 13, wherein the one or more computer-readable instructions cause the computing device to:

detect that the computing device has connected to a new wireless network;

store a geolocation of the new wireless network.

16. The non-transitory computer-readable medium of claim 13, wherein the one or more computer-readable instructions cause the computing device to store the geolocation of the wireless network by storing a geolocation of the computing device at the time the computing device most recently accessed the wireless network.

17. The non-transitory computer-readable medium of claim 13, wherein the one or more computer-readable instructions cause the computing device to prevent the computing device from sending any wireless probe packets by blocking the computing device from sending wireless probe packets that have been created by the computing device.

* * * * *

UNITED STATES PATENT AND TRADEMARK OFFICE
CERTIFICATE OF CORRECTION

PATENT NO. : 9,918,224 B1  
APPLICATION NO. : 14/949927  
DATED : March 13, 2018  
INVENTOR(S) : Shavell et al.

Page 1 of 1

It is certified that error appears in the above-identified patent and that said Letters Patent is hereby corrected as shown below:

In the Claims

In Column 15, Line 30, in Claim 1, delete "the least" and insert -- the at least --, therefor.

In Column 17, Line 13, in Claim 13, delete "the least" and insert -- the at least --, therefor.

Signed and Sealed this
Tenth Day of July, 2018

Andrei Iancu
*Director of the United States Patent and Trademark Office*